(12) United States Patent
Bae et al.

(10) Patent No.: US 12,224,602 B2
(45) Date of Patent: *Feb. 11, 2025

(54) LOW-POWER DEVICE METHOD

(71) Applicant: Samsung Electronics Co., Ltd., Suwon-si (KR)

(72) Inventors: Chisung Bae, Yongin-si (KR); Sang Joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

This patent is subject to a terminal disclaimer.

(21) Appl. No.: 17/336,974

(22) Filed: Jun. 2, 2021

(65) Prior Publication Data

US 2021/0288527 A1 Sep. 16, 2021

Related U.S. Application Data

(63) Continuation of application No. 16/018,521, filed on Jun. 26, 2018, now Pat. No. 11,050,263.

(30) Foreign Application Priority Data

Sep. 25, 2017 (KR) .................. 10-2017-0123487

(51) Int. Cl.
*H02J 7/00* (2006.01)
*H02J 7/14* (2006.01)
(Continued)

(52) U.S. Cl.
CPC .......... *H02J 7/00034* (2020.01); *H02J 50/10* (2016.02); *H02J 50/20* (2016.02); *H02J 50/80* (2016.02)

(58) Field of Classification Search
CPC .......... H02J 7/0034; H02J 50/80; H02J 50/10; H02J 50/20
(Continued)

(56) References Cited

U.S. PATENT DOCUMENTS

| 5,929,601 A | 7/1999 | Kaib et al. |
| 6,169,387 B1 | 1/2001 | Kaib |

(Continued)

FOREIGN PATENT DOCUMENTS

| JP | 10-14139 A | 1/1998 |
| JP | 2008-49055 A | 3/2008 |

(Continued)

OTHER PUBLICATIONS

Korean Office Action Issued on Sep. 27, 2022, in counterpart Korean Patent Application No. 10-2017-0123487 (6 Pages in Korean, 3 Pages in English).

*Primary Examiner* — Alexis B Pacheco
(74) *Attorney, Agent, or Firm* — NSIP Law (57) ABSTRACT

A method of controlling power on a low-power device and the low-power device for performing the method are provided. The method includes performing a first operation, of acquiring sensing data, using power stored in an internal battery of the low-power device, wherein the first operation consumes a first power consumption from the internal battery; and performing a second operation, with respect to the acquired sensing data, and which consumes a second power consumption, using power wirelessly transmitted from an external device located outside of the low-power device, wherein the second power consumption is greater than the first power consumption.

20 Claims, 5 Drawing Sheets

(51) Int. Cl.
*H02J 50/10* (2016.01)
*H02J 50/20* (2016.01)
*H02J 50/80* (2016.01)

(58) Field of Classification Search
USPC .................................................. 320/109, 137
See application file for complete search history.

(56) References Cited

U.S. PATENT DOCUMENTS

| | | | |
|---|---|---|---|
| 6,185,452 B1 | 2/2001 | Schulman et al. | |
| 6,549,807 B1* | 4/2003 | Kroll | A61N 1/3956 607/34 |
| 8,600,517 B2* | 12/2013 | Forsell | A61N 1/37211 607/34 |
| 11,050,263 B2* | 6/2021 | Bae | H02J 50/20 |
| 2004/0215287 A1 | 10/2004 | Swoyer et al. | |
| 2010/0007307 A1* | 1/2010 | Baarman | H02J 7/00034 320/108 |
| 2010/0076517 A1 | 3/2010 | Imran | |
| 2012/0053657 A1* | 3/2012 | Parker | H02J 7/00034 607/61 |
| 2012/0146575 A1 | 6/2012 | Armstrong et al. | |
| 2014/0297051 A1 | 10/2014 | Zhang et al. | |
| 2015/0028806 A1* | 1/2015 | Dearden | A61N 1/37223 320/108 |
| 2015/0290466 A1 | 10/2015 | Tai et al. | |
| 2016/0220828 A1 | 8/2016 | Yan Poon et al. | |
| 2017/0173345 A1 | 6/2017 | Abiri et al. | |
| 2017/0281944 A1* | 10/2017 | Khalil | A61N 1/3787 |
| 2018/0028824 A1* | 2/2018 | Pivonka | A61N 1/37229 |
| 2018/0169421 A1 | 6/2018 | Chen et al. | |
| 2019/0388691 A1* | 12/2019 | Wheeler | H04L 43/16 |
| 2020/0195056 A1* | 6/2020 | Rekstad | G01R 19/16542 |
| 2021/0242717 A1* | 8/2021 | Lee | H02J 50/10 |
| 2021/0288527 A1* | 9/2021 | Bae | H02J 7/00034 |
| 2021/0351628 A1* | 11/2021 | Araujo | H02J 50/70 |

FOREIGN PATENT DOCUMENTS

| | | |
|---|---|---|
| KR | 10-2016-0044811 A | 4/2016 |
| KR | 10-1625429 B1 | 5/2016 |
| KR | 10-2016-0063979 A | 6/2016 |
| KR | 10-2017-0012692 A | 2/2017 |
| WO | WO 2016/127130 A1 | 8/2016 |

\* cited by examiner

LOW-POWER DEVICE METHOD

CROSS-REFERENCE TO RELATED APPLICATIONS

This application is a continuation of application Ser. No. 16/018,521, filed on Jun. 26, 2018, which claims the benefit under 35 USC § 119(a) of Korean Patent Application No. 10-2017-0123487, filed on Sep. 25, 2017, in the Korean Intellectual Property Office, the entire disclosure of which is incorporated herein by reference for all purposes.

BACKGROUND

1. Field

The following description relates to a low-power device and method.

2. Description of Related Art

Recently, due to an increase in the efficiency in wireless power transmission technology, wireless power transmission technology is being used in various fields. For example, wireless power transmission technology is applied to a nerve stimulator designed to be inserted into a human body; however, in this example, frequent surgeries are performed due discharged batteries of the nerve stimulator. Also, because energy is lost when the battery of the nerve stimulator is charged using the wireless power transmission technology, the total energy efficiency is not high.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of controlling power on a low-power device includes performing a first operation, of acquiring sensing data, using power stored in an internal battery of the low-power device, wherein the first operation consumes a first power consumption from the internal battery; and performing a second operation, with respect to the acquired sensing data, and which consumes a second power consumption, using power wirelessly transmitted from an external device located outside of the low-power device, wherein the second power consumption is greater than the first power consumption.

The sensing data may include a neural signal of a user. The performing of the second operation may include, in response to a stimulus signal being determined to be output to the user based on the neural signal, outputting the stimulus signal generated using the power wirelessly transmitted from the external device.

The stimulus signal may be generated independently of the power stored in the internal battery.

The performing of the second operation may include storing the power wirelessly transmitted from the external device in a super capacitor, and outputting the stimulus signal generated using the power stored in the super capacitor in response to the power stored in the super capacitor exceeding a predetermined power threshold.

The method may further include, in response to the stimulus signal being determined to be output to the user based on the neural signal, transmitting a request for wireless power transmission to the external device via a wireless communication.

In response to the request for wireless power transmission being received from the low-power device, the external device may provide the user with a message to position the external device in proximity to the low-power device.

The low-power device may be anatomically implanted in the user.

The sensing data may include measurement data for an environment in which the low-power device is located. The performing of the second operation may include transmitting the measurement data to the external device using the power wirelessly transmitted from the external device.

The performing of the second operation may include storing the power wirelessly transmitted from the external device in a super capacitor, and transmitting the measurement data to the external device using the power stored in the super capacitor in response to the power stored in the super capacitor exceeding a predetermined power threshold.

The performing of the second operation may include, in response to power being wirelessly received from the external device or power together with a request for the measurement data being wirelessly received from the external device, transmitting the measurement data to the external device.

In another general aspect, a low-power device includes a processor configured to: perform a first operation, of acquiring sensing data, using a sensor that operates using power stored in an internal battery of the low-power device, wherein the first operation consumes a first power consumption from the internal battery; and instruct the low-power device to perform a second operation, with respect to the acquired sensing data, and which consumes a second power consumption using power wirelessly transmitted from an external device located outside of the low-power device, wherein the second power consumption is greater than the first power consumption.

The sensing data may include a neural signal of a user. The processor may be further configured to determine, based on the neural signal, whether to generate a stimulus signal to the user. Dependent on a result of the determine, the processor may be further configured to instruct the low-power device to output the stimulus signal generated using the power wirelessly transmitted from the external device, and in response to a stimulus signal being determined to be output to the user based on the neural signal, the processor may be further configured to instruct the low-power device to output the stimulus signal generated using the power wirelessly transmitted from the external device.

The stimulus signal may be generated independent of the power stored in the internal battery.

The low-power device may further include a super capacitor configured to store the power wirelessly transmitted from the external device, wherein, in response to the power stored in the super capacitor exceeding a predetermined power threshold, the processor is further configured to instruct the low-power device to output the stimulus signal generated using the power stored in the super capacitor.

In response to the stimulus signal being determined to be output to the user based on the neural signal, the processor may be further configured to transmit a request for wireless power transmission to the external device via a wireless communication.

The low-power device may be anatomically implanted in the user.

The sensing data may include measurement data for an environment in which the low-power device is located, and the processor may be further configured to instruct the low-power device to transmit the measurement data to the external device using the power wirelessly transmitted from the external device.

The low-power device may further include a memory configured to store instructions. The processor may be further configured to execute the instructions to configure the processor to: perform the first operation, of acquiring sensing data, using the sensor that operates using power stored in the internal battery of the low-power device, wherein the first operation consumes the first power consumption from the internal battery; and instruct the low-power device to perform the second operation, with respect to the acquired sensing data, and which consumes the second power consumption using power wirelessly transmitted from the external device located outside of the low-power device, wherein the second power consumption is greater than the first power consumption.

In another general aspect, a low-power device includes a processor configured to: perform operations, having respective power consumptions less than or equal to a power threshold value, using an internal battery of the low-power device; and perform any of the operations having respective power consumptions greater than the power threshold using power wirelessly transmitted from an external device external to the low-power device.

The operations may include acquiring a neural signal from a user and generating a stimulus signal to the user.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art in view of the present disclosure. Terms defined in dictionaries generally used should be construed to have meanings matching with contextual meanings in the related art and the present disclosure, and are not to be construed as an ideal or excessively formal meaning unless otherwise defined herein.

Hereinafter, examples will be described in detail below with reference to the accompanying drawings, and like reference numerals refer to the like elements throughout.

Figure 1:
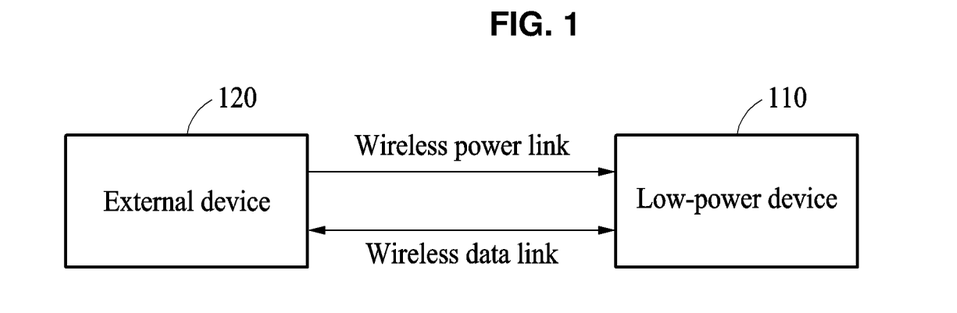
FIG. 1 is a diagram illustrating an example of a low-power device and an external device.

FIG. 1 illustrates an example of a low-power device 110 and an external device 120.

The low-power device 110 is configured to operate using power stored in an internal battery and using power wirelessly transmitted from the external device 120. For example, the low-power device 110 includes power storage and supply hardware for providing power to perform operations, as well as wireless power receiving hardware configured to receive the wirelessly transmitted power and supply the same for use by the low-power device 110 for performing the same or other operations. For example, operations of the low-power device 110 that are predetermined to consume less power, e.g., less than at least one threshold, may be selectively performed using power from either, both, or only one of the internal battery and the wirelessly transmitted power. Likewise, operations of the low-power device 110 that are predetermined to consume more power, e.g., greater than such at least one threshold or other thresholds, may be selectively performed using power from either, both, or only one of the internal battery and the wirelessly transmitted power. In another example, such operations of the low-power device 110 that are predetermined to consume the less power may be performed using only the internal battery or may be performed using the internal battery and/or the wirelessly transmitted power (e.g., if in receipt at the time of the operation), while those operations that consumes the example more power may be performed using only the power wirelessly transmitted from the external device 120.

However, when the low-power device 110 performs an operation that consumes the example more power using only the power stored in the internal battery, the life of the internal battery may rapidly deteriorate, such as due to an inadequate nominal discharge current rating of the internal battery and/or the frequency of discharge of the internal battery. Rather, when the low-power device 110 performs an operation that consumes the example less power using only the power stored in the internal battery, the life of the internal battery may not rapidly deteriorate. Accordingly, in another example, while operations that consume less power may be performed using only the power stored in the internal battery, such as being predetermined to always be performed using only the power stored in the internal battery or when wireless transmitted power is not otherwise currently being received by the low-power device 110, those operations that are determined or predetermined to consume more power may be performed only using power wirelessly transmitted from the external device 120, e.g., requiring a wireless power transfer to be requested or initiated and power received before performing the more power consuming operations or requiring such more power operations to be performed upon receipt of wirelessly transmitted power. Thus, by differentiating between which operations may be performed depending on predetermined assigned power sources or what power sources are available, such as by limiting the more power consuming operations to only being performed using the wirelessly transmitted power, the number of times an internal battery is recharged may be reduced or minimized, which may increase or maximize the life of the internal battery. Further, such differentiating of which operations are performed may enhance the efficiency of the end-to-end wireless power transmission between the low-power device 110 and the external device(s) 120.

In an example, the low-power device 110 is a medical device (for example, a nerve stimulator) implanted in a body of a user. The low-power device 110 acquires a biological signal e.g., a neural signal of a user, and determines whether an application of a stimulus to the body of the user is determined required based on the neural signal. When the stimulus is required, the low-power device 110 generates a stimulus signal and outputs the stimulus signal to the user, e.g., to surrounding or electrically connected tissue.

In this example, a small amount of power (for example, tens of microwatts (μW)) is consumed by an operation that acquires the neural signal and determines whether the stimulus is required based on the neural signal, and a relatively larger amount of power (for example, tens of milliwatts (mW)) is consumed by an operation that generates and outputs the stimulus signal and outputs the stimulus signal to the user. Thus, using the power stored in the internal battery, the low-power device 110 acquires the neural signal and determines whether the stimulus is required based on the neural signal. Using the power wirelessly transmitted from the external device 120, the low-power device 110 generates the stimulus signal and outputs the stimulus signal to the user.

In an example, the neural signal includes various bioelectrical signals, such as an electrocardiogram (ECG) signal or an electroencephalogram (EEG) signal. When the neural signal is an ECG signal, the low-power device 110 monitors an ECG signal of the user using the power in the internal battery. In this example, when an arrhythmia is detected, the low-power device 110 generates a stimulus signal and outputs the stimulus signal to the user, using the power wirelessly transmitted from the external device 120, to adjust a heart rate of the user.

When the neural signal is an EEG signal, the low-power device 110 monitors an EEG signal of the user using the power in the internal battery. In this example, when symptoms of epilepsy are detected, the low-power device 110 generates a stimulus signal and outputs the stimulus signal to the user, using the power wirelessly transmitted from the external device 120, to suppress the symptoms.

In another example, the low-power device 110 is an Internet of things (IoT) device (for example, a fresh food monitoring device) capable of performing wireless communication. The low-power device 110 acquires measurement data for an environment in which the low-power device 110 is located, and transmits the acquired measurement data to the external device 120.

In this example, a small amount of power (for example, tens of μW) is consumed by an operation that acquires the measurement data, and a large amount of power (for example, tens of mW) is consumed by an operation that transmits the measurement data to the external device 120. Thus, the low-power device 110 acquires the measurement data using the power stored in the internal battery, and transmits the measurement data to the external device 120 using power wirelessly transmitted from the external device 120.

In an example, the measurement data includes physical sensor data, for example, a temperature, a humidity and an intensity of illumination, an ultrasonic wave, a synthetic aperture radar (SAR), a radar, a location, a motion or an image in association with the environment in which the low-power device 110 is located. The low-power device 110 collects the measurement data periodically or based on an event, using the power in the internal battery, and stores the collected measurement data in a random access memory (RAM) or a flash memory that is included in the low-power device 110.

The external device 120, for example, is a power source device configured to provide power to the low-power device 110 via a wireless transmission. The external device 120 is implemented as various products, for example, a wearable device, a portable battery, a tablet computer or a smartphone that is capable of wirelessly transmitting power.

A bidirectional wireless data link and a unidirectional wireless power link is set between the low-power device 110 and the external device 120. Via the bidirectional wireless data link, the low-power device 110 transmits, to the external device 120, measurement data or a request for wireless power transmission, or receives a request for measurement data. Via the unidirectional wireless power link, the low-power device 110 receives the power wirelessly transmitted from the external device 120.

Figure 2:
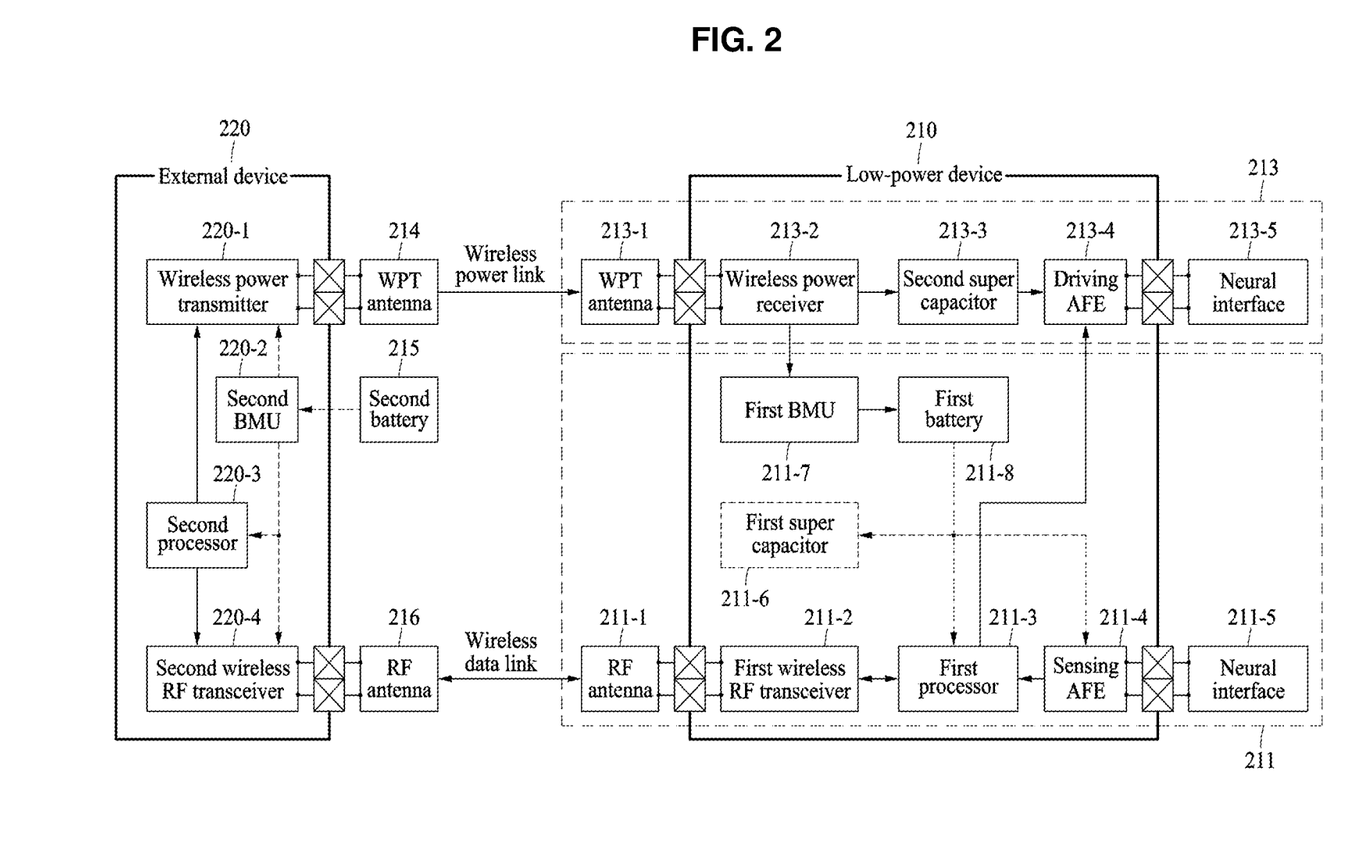
FIG. 2 is a block diagram illustrating an example of a low-power device and an external device.

FIG. 2 is a block diagram illustrating an example of a low-power device 210 and an external device 220.

The low-power device 210 is a medical device implanted in a body of a user, and includes a monitoring block 211 and a stimulating block 213.

In the monitoring block 211, a neural signal of a user is acquired through a neural interface 211-5, and power of about tens of μW is consumed. The neural interface 211-5 is an electrode that may be in direct contact with a body of the user, and a sensing analog front-end (AFE) is an AFE configured to acquire the neural signal via the neural interface 211-5. The sensing AFE 211-4 acquires the neural signal by converting an analog electrical signal input to the neural interface 211-5 into a digital signal based on the impedance and dynamic range of the neural interface 211-5. The electrical signal input to the neural interface 211-5 is an extremely weak signal, and accordingly the sensing AFE 211-4 is a type of analog-to-digital converter (ADC) that may accurately measure an extremely weak signal.

A first processor 211-3 is a microcontroller unit (MCU) configured to determine whether the neural signal acquired by the sensing AFE 211-4 is in a normal state. For example, the first processor 211-3 determines whether a waveform of the neural signal corresponds to a normal waveform. When the neural signal is determined not to be in the normal state, the first processor 211-3 determines that a wireless power transmission from the external device 220 is required. When the neural signal is determined to be in the normal state, the first processor 211-3 continues to monitor the neural signal.

A first wireless radio frequency (RF) transceiver 211-2 exchanges data with a second wireless RF transceiver 220-4 of the external device 220 via a wireless communication link. When the first processor 211-3 determines that the wireless power transmission from the external device 220 is required, the first wireless RF transceiver 211-2 transmits a request for wireless power transmission to the external device 220. For example, the first wireless RF transceiver 211-2 performs a wireless communication with the second wireless RF transceiver 220-4 of the external device 220 via a medical implant communication service (MICS), a near field communication (NFC) or an RF.

A predetermined amount of power is required to perform the wireless communication of the first wireless RF transceiver 211-2; however, the power may not be immediately available from a first battery. Thus, the power needed to perform the wireless communication is accumulated in the first battery and a first super capacitor 211-6, sequentially, before the first wireless RF transceiver 211-2 performs the wireless communication using the power stored in the first super capacitor 211-6.

The first battery is an internal battery of the low-power device 210 and is configured to supply power to operate the monitoring block 211. Also, the first battery is charged using power wirelessly transmitted from the external device 220 by a first battery management unit (BMU). In one example, the first BMU 211-7 is a subminiature battery, for example, a film battery, a solid state battery or a chip battery. The first BMU 211-7 monitors a charge state of the first battery, and charges the first battery with the power wirelessly transmitted from the external device 220 when the power stored in the first battery is reduced to be equal to or less than a predetermine threshold during monitoring.

The second wireless RF transceiver 220-4 of the external device 220 receives the request for wireless power transmission from the first wireless RF transceiver 211-2 of the low-power device 210. The second wireless RF transceiver 220-4 performs the wireless communication with the first wireless RF transceiver 211-2 via the MICS, the NFC or the RF.

A second processor 220-3 verifies the request for wireless power transmission received from the low-power device 210. In one example, the second processor 220-3 is an MCU configured to verify whether the request for wireless power transmission is a normal request.

When the request for wireless power transmission is determined to be a normal request, the second processor 220-3 provides a user with a message to move the external device 220 closer or near the low-power device 210. For example, the second processor 220-3 displays the message on a display of the external device 220, or outputs the message as an audio signal and/or in a predetermined oscillation pattern.

A wireless power transmitter 220-1 is, for example, a circuit configured to supply power to a wireless power transfer (WPT) antenna 214 for a wireless power transmission. The wireless power transmitter 220-1 receives a power stored in the second battery 215 via a second BMU 220-2 and performs a wireless power transmission.

The external device 220 is attached external to a body of a user, or is adhered to or brought into proximity of a surface body whenever the external device 220 is required to wirelessly transmit power to the low-power device 210.

In the stimulating block 213, the low-power device 210 outputs a stimulus signal to a user, and a power of about tens of mW is consumed. A wireless power receiver 213-2 receives power that is wirelessly transmitted by the wireless power transmitter 220-1. In one example, the wireless power receiver 213-2 includes a circuit, for example, a rectifier, configured to receive power that is wirelessly transmitted.

A second super capacitor 213-3 is charged with the power received by the wireless power receiver 213-2. The second super capacitor 213-3 is charged until the power of the second super capacitor 213-3 reaches a predetermined power threshold. When the power of the second super capacitor 213-3 reaches a power threshold, a driving AFE 213-4 is operated by supplying power to the driving AFE 213-4.

The driving AFE 213-4 generates a stimulus signal using power stored in the second super capacitor 213-3 and outputs the stimulus signal to the user via a neural interface 213-5. The driving AFE 213-4 generates a stimulus signal based on the impedance and the dynamic range of the neural interface 213-5. The driving AFE 213-4 is a type of one or more digital-to-analog converters (DACs) configured to convert a digital stimulus signal into an analog signal. The driving AFE 213-4 includes, for example, a nerve stimulator, a heart stimulator, or a brainwave stimulator.

Figure 3:
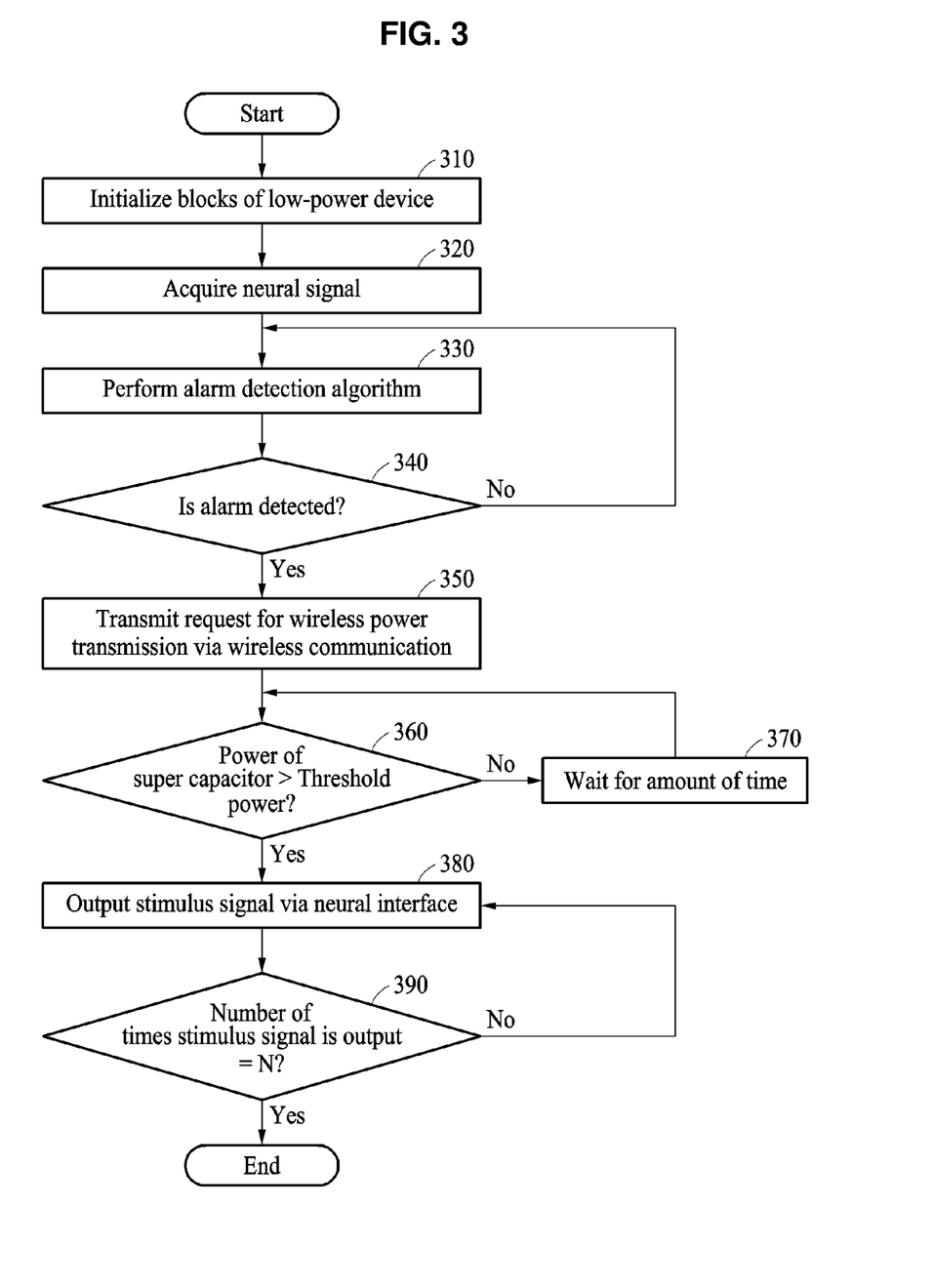
FIG. 3 is a diagram illustrating an example of an operating method of a low-power device corresponding to a medical device.

FIG. 3 illustrates an example of an operating method of a low-power device corresponding to a medical device.

In operation 310, the low-power device initializes blocks included in the low-power device. For example, the low-power device initializes an operating speed of a processor and a gain of a sensing AFE 211-4.

In operation 320, the low-power device acquires a neural signal using the sensing AFE 211-4. The low-power device acquires the neural signal periodically or based on an event. The neural signal includes, for example, an ECG signal or an EEG signal. In an example, the low-power device acquires neural signals at predetermined intervals. In another example, the low-power device acquires neural signals every time a predetermined event (for example, a sudden change in a neural signal) occurs.

In operation 330, the low-power device performs an alarm detection algorithm based on the neural signal. An alarm indicates that the neural signal is in an abnormal state. The low-power device detects an alarm by determining whether the neural signal is in a normal state.

In operation 340, the low-power device determines whether the alarm is detected. For example, when the neural signal is determined to be in the normal state, that is, when the alarm is not detected, the low-power device acquires a neural signal again in operation 320.

When the neural signal is determined to be in the abnormal state, that is, when the alarm is detected, the low-power device transmits a request for wireless power transmission to an external device via a wireless communication in operation 350. When the request for wireless power transmission is received, the external device wirelessly transmits power to the low-power device.

In operation 360, the low-power device charges a super capacitor with the power wirelessly transmitted from the external device, and determines whether power stored in the super capacitor through the charging exceeds a predetermined power threshold. In an example, when the power stored in the super capacitor does not exceed the power threshold, the low-power device waits for a predetermined amount of time in operation 370. When the predetermined amount of time elapses, the low-power device determines, again, whether the power stored in the super capacitor exceeds the power threshold.

In another example, when the power stored in the super capacitor exceeds the power threshold, the low-power device operates a driving AFE 213-4 using the power stored in the super capacitor, generates a stimulus signal, and outputs the stimulus signal via a neural interface 213-5 in operation 380.

In operation 390, the low-power device determines whether a number of times the stimulus signal is output is equal to a predetermined number N. In an example, when the number of times the stimulus signal is output is less than N, the low-power device outputs the stimulus signal again in operation 380. In another example, when the number of times the stimulus signal is output is equal to N, the low-power device terminates a stimulation mode, and operates in a neural signal monitoring mode again.

Figure 4:
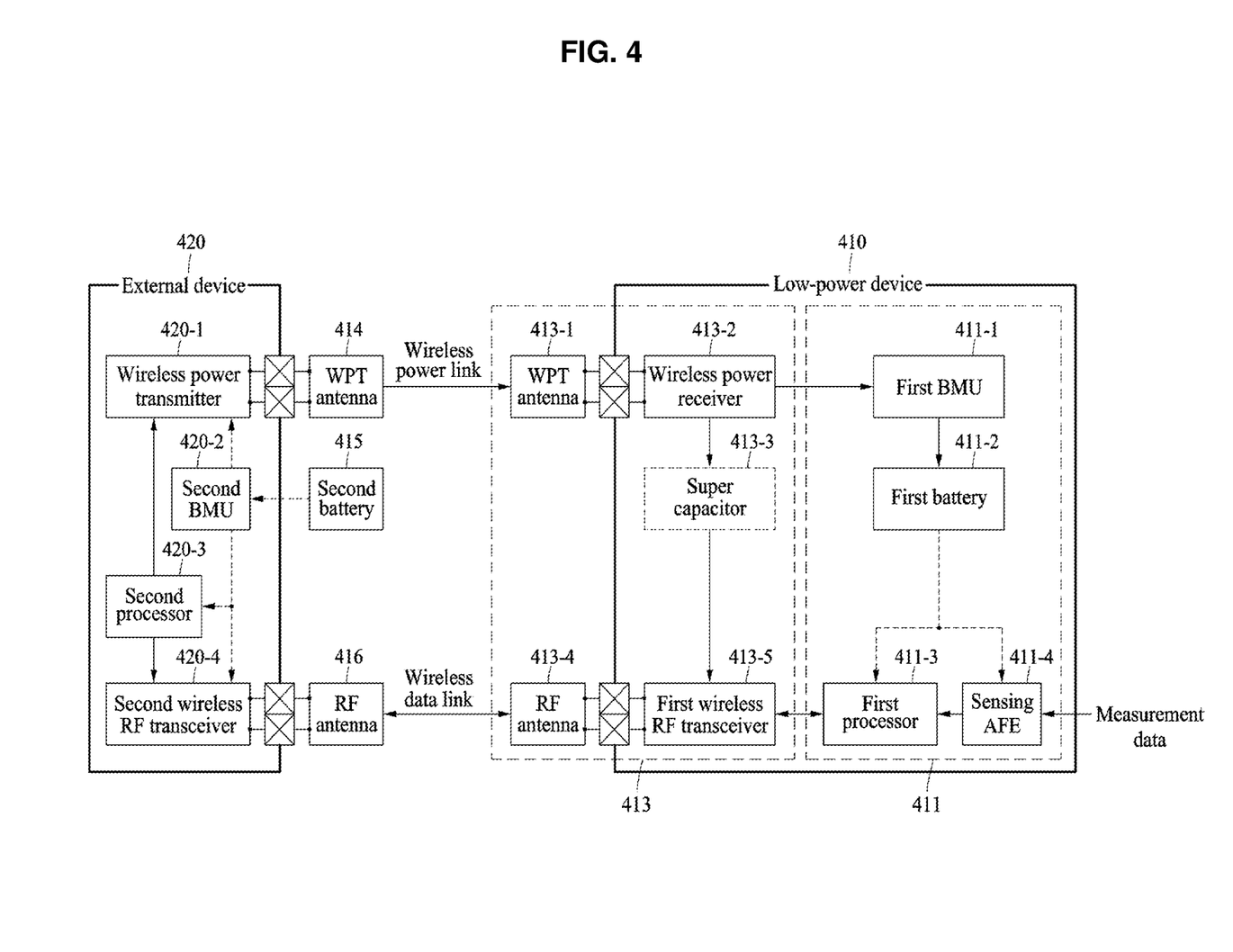
FIG. 4 is a block diagram illustrating an example of a low-power device and an external device.

FIG. 4 is a block diagram illustrating an example of a low-power device 410 and an external device 420.

The low-power device 410 is an IoT device capable of performing a wireless communication, and includes a monitoring block 411 and a reporting block 413.

The monitoring block 411 acquires measurement data in an environment where the low-power device 410 is located, and consumes power of about tens of μW. A sensing AFE 411-4 acquires, as the measurement data, physical sensor data that may include any one or any combination of any two or more of a temperature, a humidity, an intensity of illumination, an ultrasonic wave, an SAR, a radar, a location, a motion or an image in association with the environment in which the low-power device 410 is located. The sensing AFE 411-4 acquires the measurement data periodically or based on an event. In an example, the sensing AFE 411-4 acquires the measurement data at predetermined intervals. In another example, the sensing AFE 411-4 acquires the measurement data every time a predetermined event (for example, a sudden change in the temperature, the humidity, the intensity of illumination, the ultrasonic wave, the SAR, the radar, the location, the motion or the image) occurs.

A first processor 411-3 stores, in an internal memory, measurement data collected by the sensing AFE 411-4. Also, when power is wirelessly received from the external device 420 or when power together with a request for the measurement data are wirelessly received from the external device 420, the first processor 411-3 instructs the low-power device 410 to wirelessly transmit the measurement data stored in the internal memory.

The sensing AFE 411-4 and the first processor 411-3 operate using a first battery 411-2. The first battery 411-2 is an internal battery included in the low-power device 410. A first BMU 411-1 charges the first battery 411-2 with power wirelessly transmitted from the external device 420, based on a charge state of the first battery 411-2.

In the reporting block 413, the measurement data is transmitted to the external device 420 via a wireless communication, and power of about tens of mW is consumed. A wireless power receiver 413-2 receives the power wirelessly transmitted from the external device 420. The power received by the wireless power receiver 413-2 is used to charge a super capacitor 413-3.

When power stored in the super capacitor 413-3 exceeds a predetermined threshold voltage or power, a first wireless RF transceiver 413-5 transmits the measurement data to a second wireless RF transceiver 420-4 of the external device 420, using the power stored in the super capacitor 413-3. The first wireless RF transceiver 413-5 transmits the measurement data to the second wireless RF transceiver 420-4 of the external device 420, via various wireless communication links, for example, a Bluetooth link, a ZigBee link, or a wireless fidelity (Wi-Fi) link.

The above description is also applicable to the low-power device 410 and the external device 420, and accordingly is not repeated here.

Figure 5:
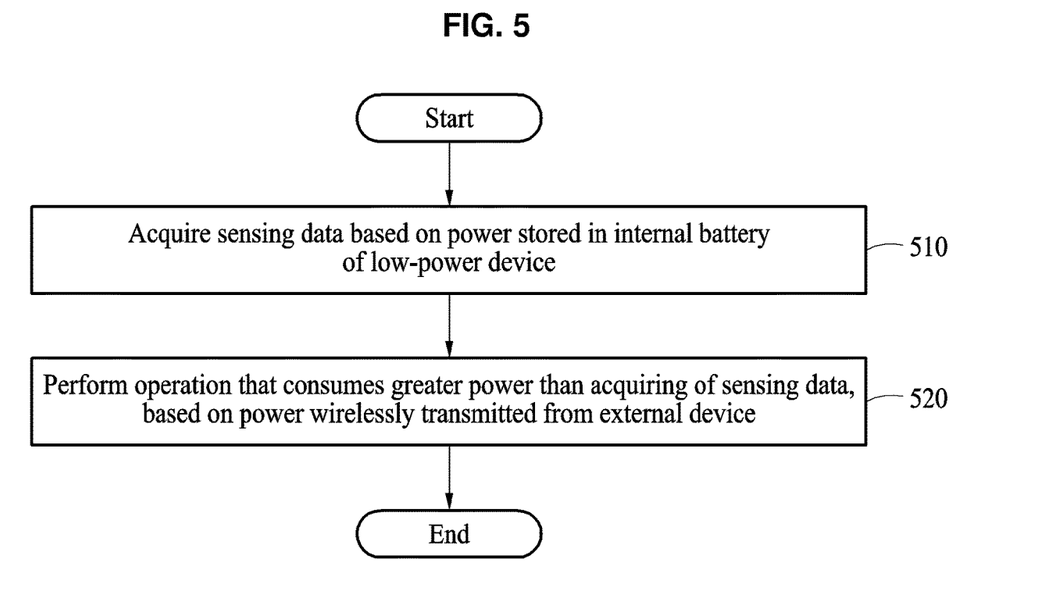
FIG. 5 is a flowchart illustrating an example of a method of controlling power on a low-power device.

FIG. 5 is a flowchart illustrating an example of a method of controlling power on a low-power device.

The method of FIG. 5 is performed, for example, by a processor of the low-power device.

Referring to FIG. 5, in operation 510, the low-power device acquires sensing data using power stored in an internal battery of the low-power device. In an example, when the low-power device is a medical device, the sensing data includes a neural signal of a user. In another example, when the low-power device is an IoT device, the sensing data includes measurement data for an environment in which the low-power device is located.

In operation 520, the low-power device performs an operation that consumes greater amount of power than that consumed by the acquiring of the sensing data, using power wirelessly transmitted from an external device.

In an example, when the low-power device is a medical device, and when it is determined that a stimulus signal needs to be output to a user based on the neural signal, the low-power device outputs a stimulus signal generated using the power wirelessly transmitted from the external device. In this example, the stimulus signal is generated independently of the power stored in the internal battery. In other words, when the low-power device generates the stimulus signal, the power stored in the internal battery is not used.

Also, the low-power device stores, in a super capacitor, the power wirelessly transmitted from the external device. When the power stored in the super capacitor exceeds a predetermined power threshold, the low-power device outputs a stimulus signal generated using the power stored in the super capacitor.

In another example, when the low-power device is an IoT device, the low-power device transmits measurement data to the external device using the power wirelessly transmitted from the external device. Also, the low-power device stores, in a super capacitor, the power wirelessly transmitted from the external device. When the power stored in the super capacitor exceeds a predetermined power threshold, the low-power device transmits the measurement data to the external device using the power stored in the super capacitor.

The above description of FIGS. 1 through 4 is also applicable to the method of FIG. 5, and accordingly is not repeated here.

The low-power devices 110, 210 and 410, the external devices 120, 220 and 420, and other apparatuses, units, modules, devices, and other components described herein with respect to FIGS. 1, 2 and 4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A low-power device, comprising:
a battery;
a storage element configured to store power wirelessly transmitted from an external device; and
a processor configured to perform operations using power from power sources including the battery and the storage element, wherein, based on respective levels of power consumed by the operations, some of the operations are performed using power directly from the battery and some of the operations are performed using power directly from the storage element.

2. The low-power device of claim 1, wherein the storage element is separate from the battery.

3. The low-power device of claim 1, further comprising:
a wireless power receiver coupled to the storage element and configured to receive the power wirelessly transmitted from the external device.

4. The low-power device of claim 3, further comprising:
a first antenna coupled to the wireless power receiver and configured to receive the power wirelessly transmitted from the external device.

5. The low-power device of claim 3, wherein the storage element is charged with the power received by the wireless power receiver until the power of the storage element reaches a power threshold.

6. The low-power device of claim 1, further comprising:
a signal driver coupled to the storage element and configured to output a stimulus signal generated using the power stored in the storage element.

7. The low-power device of claim 1, wherein the battery is configured to supply power to monitor a neural signal of a user.

8. The low-power device of claim 1, further comprising:
a processor configured to determine that a wireless power transmission from the external device to the low-power device is required, and
a wireless RF transceiver coupled to the processor and configured to transmit a request for the wireless power transmission to the external device.

9. The low-power device of claim 8, further comprising:
a second antenna coupled to the wireless RF transceiver and configured to transmit the request for the wireless power transmission to the external device through a wireless data link.

10. The low-power device of claim 1, wherein the processor is further configured to instruct the low-power device to output a stimulus signal generated using the power stored in the storage element.

11. The low-power device of claim 1, further comprising:
a sensor coupled to the processor and configured to acquire a neural signal of a user.

12. The low-power device of claim 11, wherein the processor is further configured to:
determine whether the neural signal acquired by the sensor is in a normal state; and
continue to monitor the neural signal in response to determining that the neural signal is in a normal state.

13. The low-power device of claim 12, wherein the processor is further configured to transmit a request for a wireless power transmission to the external device in response to determining that the neural signal is not in a normal state.

14. The low-power device of claim 1, wherein the processor is further configured to instruct the low-power device to output a stimulus signal generated using the power stored in the storage element.

15. The low-power device of claim 1, further comprising:
a wireless RF transceiver configured to transmit measurement data for an environment in which the low-power device is located to the external device using the power stored in the storage element when power stored in the storage element exceeds a threshold voltage or threshold power.

16. The low-power device of claim 15, further comprising:
a second antenna coupled to the wireless RF transceiver and configured to transmit the measurement data to the external device through a wireless data link.

17. The low-power device of claim 1, wherein the storage element comprises a super capacitor.

18. The low-power device of claim 1, wherein the processor is further configured to:
perform operations, having respective power consumptions less than or equal to a power threshold, using the battery of the low-power device; and
perform any of the operations having respective power consumptions greater than the power threshold, using the power wirelessly transmitted from the external device.

19. The low-power device of claim 1,
wherein the power stored in the battery is used to monitor a neural signal of a user, and
wherein the power wirelessly transmitted from the external device located outside of the low-power device and stored in the storage element is used to generate a stimulus signal to the user.

20. The low-power device of claim 1,
wherein the power stored in the battery is used to monitor a neural signal of a user, and
wherein the power wirelessly transmitted from the external device located outside of the low-power device and stored in the storage element is used to transmit data to the external device.

* * * * *